United States Patent [19]

Cahill et al.

[11] Patent Number: 5,488,455
[45] Date of Patent: Jan. 30, 1996

[54] ELECTROGRAPHICALLY PRODUCED IMAGED ARTICLE

[75] Inventors: Douglas A. Cahill, Belchertown; Donald A. Brault, Granby; Richard S. Himmelwright, Wilbraham; Dene H. Taylor, Holyoke, all of Mass.

[73] Assignee: Rexam Graphics, South Hadley, Mass.

[21] Appl. No.: 453,383

[22] Filed: May 30, 1995

Related U.S. Application Data

[60] Division of Ser. No. 219,395, Mar. 29, 1994, which is a continuation-in-part of Ser. No. 115,563, Sep. 3, 1993, Pat. No. 5,363,179, which is a continuation-in-part of Ser. No. 42,278, Apr. 2, 1993, abandoned.

[51] Int. Cl.$^6$ .................................................. G03G 15/00
[52] U.S. Cl. .......................... 355/202; 355/200; 156/277; 430/124; 430/126
[58] Field of Search ...................... 355/277–281, 355/200, 202; 156/230, 233, 235, 238, 240, 241, 247, 249, 344; 428/914, 195; 430/126, 199, 200, 252, 254, 348, 124; 503/227; 347/113, 114

[56] References Cited

U.S. PATENT DOCUMENTS

| | | | |
|---|---|---|---|
| 3,567,571 | 11/1967 | Martinovich | 161/206 |
| 4,007,489 | 2/1977 | Helmberger et al. | 358/78 |
| 4,322,467 | 3/1982 | Heimbach et al. | 428/200 |
| 4,555,436 | 11/1985 | Geurtsen et al. | 428/200 |
| 4,569,584 | 2/1986 | St. John et al. | 355/208 X |
| 4,581,266 | 4/1986 | Magnotta | 428/40 |
| 4,686,163 | 8/1987 | Ng et al. | 430/47 |
| 4,731,542 | 3/1988 | Doggett | 250/548 |
| 4,875,961 | 10/1989 | Oike et al. | 156/234 |
| 4,965,242 | 10/1990 | De Boer et al. | 503/227 |
| 4,983,487 | 1/1991 | Gilreath | 430/126 |
| 5,071,728 | 12/1991 | Watts | 430/126 |
| 5,102,768 | 4/1992 | Light et al. | 430/126 |
| 5,108,865 | 4/1992 | Zwaldo et al. | 430/126 |
| 5,217,793 | 6/1993 | Yamane | 428/195 X |
| 5,244,524 | 9/1993 | Yamane | 156/230 |
| 5,250,133 | 10/1993 | Kawamuza et al. | 156/240 |
| 5,269,865 | 12/1993 | Kushida et al. | 156/234 |
| 5,269,866 | 12/1993 | Kushida et al. | 156/234 |
| 5,273,808 | 12/1993 | Mano et al. | 428/195 |
| 5,280,005 | 1/1994 | Nakajima et al. | 503/227 |
| 5,281,573 | 1/1994 | Kawasaki et al. | 503/227 |
| 5,286,521 | 2/1994 | Matsuda et al. | 427/146 |
| 5,286,559 | 2/1994 | Kaneko et al. | 428/341 |
| 5,292,710 | 3/1994 | Egashiza et al. | 503/227 |
| 5,294,591 | 3/1994 | Egashiza et al. | 503/227 |
| 5,296,444 | 3/1994 | Saiki et al. | 503/227 |
| 5,320,885 | 6/1994 | Yamane et al. | 428/195 |

FOREIGN PATENT DOCUMENTS 0437073  7/1991  European Pat. Off. .

*Primary Examiner*—Matthew S. Smith
*Attorney, Agent, or Firm*—Breneman, Georges & Krikelis

[57] ABSTRACT

Novel electrographically produced products are disclosed which include large format posters, billboards and the like produced by a process employing a novel electrographic element which includes a base, a release layer and a combined transparent dielectric and adhesive layer which is substantially tack-free, at ambient pressure and temperature. The new product is made by an imaging process involving: A) producing a toned image layer on the surface of the electrographic element and B) pressure laminating a receptor substrate at an elevated temperature to the toned image layer to form the completed electrographic image. The base and release layer may be stripped from the dielectric/adhesive layer which then serves to protect the transferred, toned, electrographically generated image from abrasion and environmental contaminants.

12 Claims, 2 Drawing Sheets

ELECTROGRAPHICALLY PRODUCED IMAGED ARTICLE

CROSS REFERENCES TO RELATED APPLICATIONS

This is a division of application Ser. No. 08/219,395, filed Mar. 29, 1994 which is a continuation-in-part of U.S. Ser. No. 08/115,563, filed Sep. 3, 1993 now U.S. Pat. No. 5,363,179 which is a continuation in part of U.S. Ser. No. 08/042,278, filed Apr. 2, 1993, now abandoned..

BACKGROUND OF THE INVENTION

1. Field of the Invention

This invention relates to electrographic processes for making color images. More particularly, this invention relates to electrographic processes and the elements used therein for the production of large size, full color images.

2. Description of Related Art

The use of electrographic processes in the manufacture of multicolor images is well known in the art. In such processes, an electrostatic latent image is produced directly by imagewise depositing charge onto an accepting dielectric surface. Typically, styli are used to create these charge patterns and are arranged in linear arrays across the width of the moving dielectric surface. Such processes and the required apparatus are disclosed, for example, in U.S. Pat. Nos. 4,007,489; 4,731,542; and 4,569,584. In U.S. Pat. No. 4,569,584, only one stylus array is used and the accepting surface web is traversed to-and-fro to make successive images, the toning stations being disposed on either side of the single charging station. In the other designated U.S. patents, the electrographic printer consists of three or more printing stations in sequence, each containing charging arrays and toning stations. In all of the disclosed processes, a multicolor toner image is assembled on an accepting surface of a support and fixed there for display.

In a number of applications the electrographically produced imaged is transferred onto a receiving substrate. A method for transferring such as an electrographically produced toner image, from an initial substrate to a final substrate is disclosed in U.S. Pat. No. 4,983,487. The disclosed method employs an adhesive-coated film to lift the image from its initial substrate and to secure it to the final substrate. The film remains in place after the transfer is completed and serves to encapsulate and protect the image. The initial substrate remains intact and may be reused.

Another transfer process is disclosed in U.S. Pat. No. 5,102,768 for providing a non-electrostatically transferred toned image. In this process, an electrostatic latent image is conventionally formed on the surface of an element and that element is conventionally developed into a visible image by applying toner powder. The toned image is then thermally transferred from the surface of an element by contact to the face of a thermoplastic film that is strippably laminated to a paper or like backing. The film is then positioned against a receiver with the toner image therebetween, and the composite is subjected to two successive stages of compressive heating. It is disclosed that the process produces high resolution images from very small particle size toner powder on rough paper.

An offset transfer process of electrographically produced toner images is disclosed in U.S. Pat. No. 5,108,865. In the disclosed process, a liquid toned image is generated on the surface of an electrographic element. The image is adhered to the adhesive surface of a temporary receptor sheet which comprises a carrier layer, releasable release layer, and a transferable adhesive layer secured to the release layer. The temporary receptor sheet with the image adhered thereto is removed from the electrographic element, and then the image surface of the temporary receptor sheet is contacted with a final receptor surface. The adhesive layer secures the toner image, adhesive layer and release layer to the final receiving layer and the carrier layer is removed from the release layer to generate the final image wherein the release layer now is a top protective layer.

A toner developed electrostatic imaging process for outdoor signs is disclosed in European Patent Publication No. 0437073 A2 (E.P. Application No. 90313976.4). This publication describes an electrographic imaging process (as contrasted to an electrophotographic process), in which electrostatic images are toned in sequence to form an intermediate image on a temporary dielectric receptor. The intermediate image is then transferred from the temporary dielectric receptor to a permanent receptor. In the disclosed process certain relative properties of the toner and the intermediate image, such as surface energy, Tg, work of adhesion, and complex dynamic viscosity, were identified as being important to the production of good final images.

Each of the electrographic processes disclosed in the patent publications discussed supra, employ a transfer of the toned image from an electrographic element to the final substrate using an intermediate transfer element. Although advances have been made in retaining the integrity of the toned image, such transfer steps remain prone to image degradation by abrasion or chemical interaction unless added laminating or coating steps are used. There continues to be a need for a simplified process to provide protected, distortion-free, full-color images, particularly, for use on large format posters, billboards and the like.

SUMMARY OF THE INVENTION

These needs are met by the electrographic imaging process of this invention in which a specially developed electrographic imaging element is used to produce an image on a receptor surface. Such an element comprises:

a) a conductive base having a front and a back side, b) a release layer coated on the front side, and c) a single combined dielectric and adhesive layer overlaying the release layer, whose adhesive properties are activated at a pressure and a temperature which is above ambient pressure and temperature of the electrographic element.

This element is used in a process for forming an electrographic image on a receptor substrate comprising the steps:

A) electrographically producing on the surface of an electrographic element a toned image layer to form an imaged electrographic element, wherein the electrographic element comprises in the order given;
 a) a conductive base,
 b) a release layer, and
 c) a single, combined, substantially tack-free, dielectric and adhesive layer which is activated at a pressure and a temperature which is above ambient pressure and temperature of the electrographic element;
 wherein the toned image layer is adhered to the surface of the combined dielectric and adhesive layer; and B) pressure laminating the receptor substrate to the toned image layer at a temperature which is above the ambient temperature, to form a laminated image element.

In a preferred mode, the process includes an additional step (C) wherein the conductive base and release layer are removed from the combined dielectric and adhesive layer of the laminated image element formed following the lamination step (B).

BRIEF DESCRIPTION OF THE DRAWINGS

The invention can be more fully understood from the following description thereof in connection with the accompanying drawings described as follows.

DETAILED DESCRIPTION OF THE INVENTION

Figure 1:
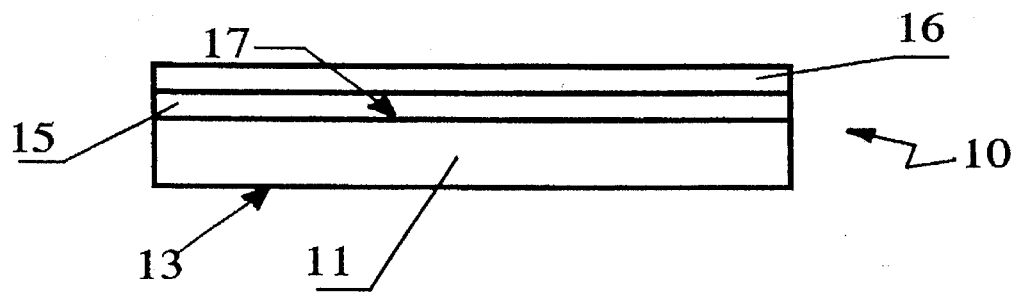
FIG. 1, is a schematic cross-sectional representation of an element in accordance with the present invention.

The electrographic process of this invention will now be described by reference to the accompanying drawings. Throughout the following description, similar reference characters refer to similar elements in all FIGURES of the drawings. Referring to FIG. 1, an electrographic element (10) is shown which comprises a conductive base (11) having a front side (17) and a back side (13). The front side (17) is covered by a release layer (15) which in turn is overlaid by a combined dielectric and adhesive layer (16).

Figure 2:
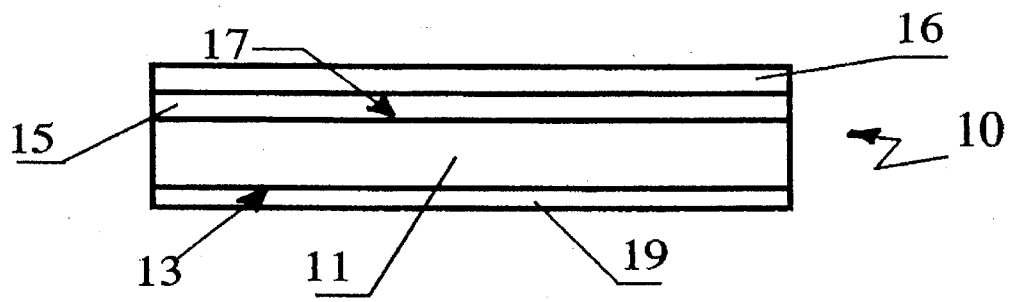
FIG. 2, is a schematic cross-sectional representation of an alternate element in accordance with the present invention.

In an alternate embodiment illustrated in FIG. 2, the base back side (13) of base (11) is covered by a conductive layer (19). And in yet another embodiment, illustrated in FIG. 3, the element (10) comprises a base that includes a carrier layer (12) and a conductive layer (14) over the carrier layer. An optional second conductive layer (19) shown in phantom lines in FIG. 3, may again be provided on the back side (13) of the base.

In all of the above elements, the base (11) functions as a support to the superposed layers and may be any web or sheet material possessing suitable flexibility, dimensional stability and adherence properties to the release layer (15). Typically, the base will have an electrical resistivity of about 1 to 30 meg-ohm per □.

Suitable web or sheet materials for the base are flexible polymeric films, e.g., such as polyethylene terephthalate film and the like, or a foraminous material, e.g., such as a paper sheet and the like, treated to be electrically conductive or semi-conductive. Other suitable materials are for instance, metal foils, metallized polymeric films such as polyethylene terephthalate films having a metallic coating thereon, conductive paper sheeting and the like. The web or sheet may also be surface treated or coated with a material to enhance desired surface characteristics.

Figure 3:
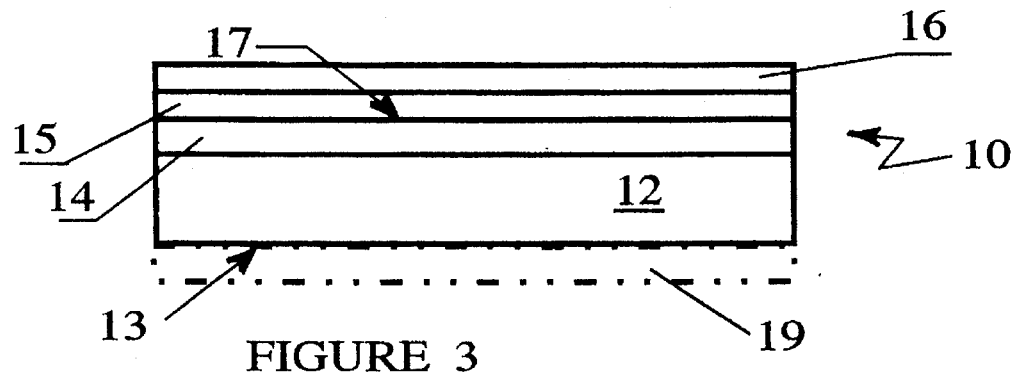
FIG. 3, is a schematic cross-sectional representation of yet another element in accordance with the present invention.

As illustrated in FIG. 3, the base may comprise a combination of carrier layer (12) and a conductive layer (14). In this embodiment the carrier layer (12) is again a flexible web or sheet material, which may again be a flexible polymeric film, e.g., such as polyethylene terephthalate film and the like, or a foraminous material, e.g., such as a paper sheet and the like. A conductive layer (14) is coated over the carrier layer (12) which carrier layer may or may not be itself conductive.

The conductive layer (14) preferably comprises a film-forming material which may be an organic material, e.g., such as a cation type styrene-methacrylate copolymer having an electrical resistivity of about 1 to 30 meg-ohm per □. Other suitable film-forming, organic materials include polymeric quaternary ammonium compounds, polystyrene sulfonic acid, polymeric matrices capable of ionizing inorganic electrolytes contained therein, and the like. The film-forming, organic material may be used alone or with conductive, inorganic materials and/or metals dispersed therein, e.g., such as tin oxide, aluminum and the like.

The release layer which is adhered to the front surface (17) of the base (11) or the conductive layer (14) as shown in FIGS. 1, 2 and 3, typically comprises a film forming silicone polymer, or a film forming fluoropolymer. The release layer may also be heat cured, U.V. radiation cured, or electron beam cured. The release layer may itself be conductive or contain conductive agents such as a quaternary ammonium polymer, and may further include a surfactant. Good release performance has been obtained when the surface energy of the release layer is between 20 and 40 dynes/cm and preferably between 25 and 35 dynes/cm.

The combined dielectric and adhesive layer 16 may be any conventional film-forming material having a dielectric constant of about 2 to about 5. This layer typically has a thickness in the range of about 1 µm to about 20 µm and preferably in the range of about 5 µm to about 15 µm.

This combined dielectric and adhesive layer (16) typically comprises one or more polyesters; polyurethanes; polyamides; polyolefins; polycarbonates; polystyrenes; and/or polymers or copolymers of acrylic or methacrylic acids, esters, amides, or the like (such as polymethylmethacrylate), styrenes, acrylonitriles, vinyl esters, alkyd substituted vinyl esters, vinyl alcohol, vinyl acetals (e.g., polyvinyl butyral), vinyl chloride, vinyl fluoride, vinylidene chloride, 1,4-dienes (e.g., butadiene, isoprene and the like); ethylene/vinyl alcohol copolymers; copolymers of styrene with acrylic and methacrylic monomers; modified cellulosic resins such as cellulose acetate and cellulose acetate butyrate; block copolymer thermoplastic rubbers (e.g., styrene/ethylene/butylene/styrene block copolymer); and blends of the above.

The combined dielectric and adhesive layer (16) in addition to its dielectric properties, is activated at a pressure and a temperature that is above the normal ambient pressure and temperature of the electrographic element prior to use to exhibit its adhesive properties. Thus the combined dielectric and adhesive layer is non tacky prior to activation.

The surface of the combined dielectric and adhesive layer (16) may be rough to ensure good transfer of charge during passage of the element under the stylus bar during imaging. This roughness can be obtained by including in the layer particles sufficiently large to give surface irregularities to the layer. Particles of diameter in the range of about 1 µm to about 15 µm are suitable. Particle composition and size are chosen to give the required dielectric constant to the layer as well as the appropriate surface topography and abrasive properties to the layer.

The combined dielectric and adhesive layer (16) is visually transparent in at least one region within the visible spectral region and preferably is transparent throughout the visible spectral region. By transparent, it is meant that the layer allows the visual observation of a toned image placed on one side of said layer through the layer. In describing this invention the term transparent is used to designate both commonly referred to as translucent and transparent layers.

This layer may contain components which strongly absorb ultraviolet radiation thereby reducing damage to underlying images by ambient ultraviolet light, e.g., such as 2-hydroxybenzophenones; oxalanilides; aryl esters and the like; hindered amine light stabilizers, such as bis(2,2,6,6-tetramethyl-4-piperidinyl) sebacate and the like; and combinations thereof. This layer serves as a protective layer to the transferred toned image after the image has been transferred onto a receptor substrate as will be described bellow. In such case the layer typically will withstand scribing with the point of a 4H pencil without breakthrough.

At times it is desired to provide a range of surface finishes to the finished image. This is done by controlling the surface of the imaged layer on the receptor. This surface is the combined dielectric and adhesive layer surface and its nature will depend on the nature of the surface of the release layer in contact therewith. Thus if the release layer on the carrier sheet results in a rough texture, the final image will appear matte, and if the release layer surface texture is smooth, the final image will be glossy. Thus controlling the roughness of the base and the coating weight ( and thus the thickness) of the release layer, allows control of the glossiness of the finished image. Alternatively, a matte surface on the finished image can be obtained by including in the combined dielectric and adhesive layer particles sufficiently large to give surface irregularities to the layer. Particles of average diameter in the range of about 1 µm to about 15 µm are suitable.

To produce an image using any of the electrographic elements described herein above, an latent electrostatic image is first formed on the surface of the combined dielectric and adhesive layer (16). Any conventional electrographic process may be used to form a toned image layer (18) on the surface of the adhesive layer (16), e.g., such as those processes and associated required apparatus which are disclosed in U.S. Pat. Nos. 4,007,489; 4,731,542; and 4,569,584, and in European Patent No. Publication No. 0437073 A2 (E.P. Application No. 90313976.4) discussed supra. In such processes, an electrostatic latent image is produced directly by imagewise depositing charge onto an accepting dielectric surface. Typically, styli are used to create these charge patterns and are arranged in linear arrays across the width of the moving dielectric surface. When the element of the present invention is used, the latent electrostatic image is formed on the surface of the combined dielectric and adhesive layer (16).

Figure 4:
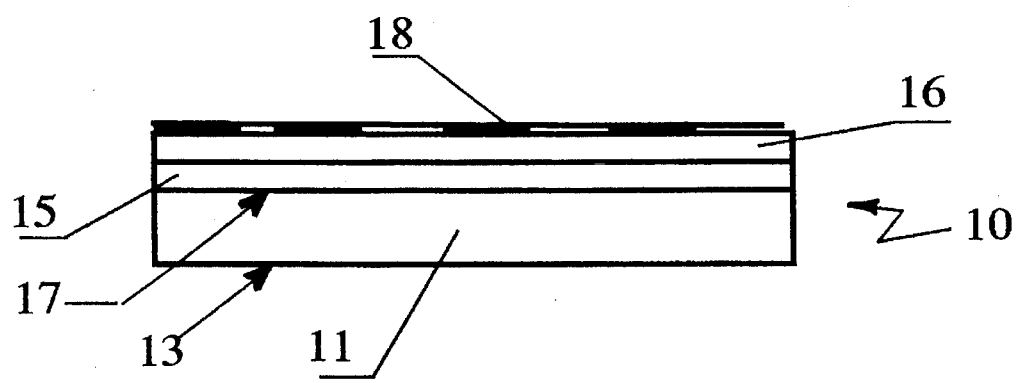
FIG. 4, schematically illustrates a toned imaged electrographic element used in the process of producing an image according to the present invention.

The latent image is next rendered visible by toning with an appropriate toner. FIG. 4 illustrates such an imagewise toned element (10) in which the toned areas are shown as areas (18).

Figure 5:
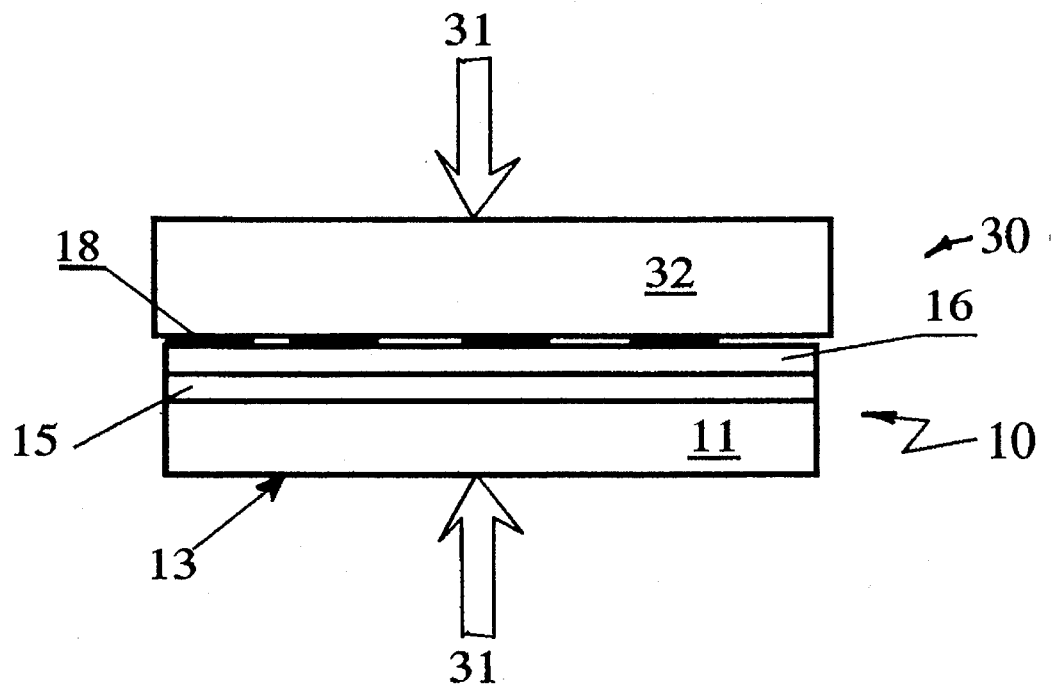
FIG. 5, schematically illustrates the step of laminating the element of FIG. 4 on a receptor surface for producing an image according to the present invention.

After the image has been produced on the element, a receptor substrate is pressure laminated onto the surface of the toned image layer (18) of the imaged electrographic element (10) at a temperature which is above the ambient temperature. Referring to FIG. 5, the receptor substrate (32) is contacted and pressure laminated to the toned image layer (18) using an applied pressure (31) to the back side of the base (11) and receptor substrate (32) to form a laminated imaged electrographic element (30). In this embodiment, the base layer (11) and release layer (15) remain adhered to the combined dielectric and adhesive layer (16) and serve to protect the imaged electrographic element (30) from scratching, abrasions, environmental components and contaminants, and the like.

The receptor substrate (32) typically functions as the final support for the imaged electrographic element (30) formed during the process steps of this invention. The receptor substrate (32) may be any surface upon which an electrographic image is desire. Typically, it is a web or sheet material possessing dimensional stability and adherence properties to the activated adhesive properties of the combined dielectric and adhesive layer (16) of the imaged electrographic element (10). Such web or sheet material may be a flexible polymeric film, e.g., such as polyethylene terephthalate film and the like; a foraminous material, e.g., such as a paper sheet, textile fabrics, and the like; metal films or webs, e.g., such as aluminum, steel, tin-plate, and the like; or any composites or laminates thereof.

The receptor substrate (32) may also be a rigid or semi-rigid sheeting or plate, e.g., such as sheeting or plates of metal, glass, ceramic, plastic, cardboard, or any composites or laminates thereof. The receptor substrate (32) may vary in size from that of a photographic print, e.g., having an area of about 30 $cm^2$ or less, to that of billboards, e.g., having an area of about 70 $m^2$ or greater.

The receptor substrate may be surface treated or coated with a material to enhance desired surface characteristics.

In accordance with the process of the present invention, the receptor substrate (32) typically is pressure laminated to the toned image surface of the imaged electrographic element (10) under an applied pressure (31) of about atmospheric pressure or greater but may range from about 0.5 $kg/cm^2$ (7 p.s.i.) to about 100 $kg/cm^2$ (1422 p.s.i.) or more. The term "applied pressure" is intended to mean the absolute pressure which is applied to a unit area of the surface as conventionally derived from the geometry of the pressure means, e.g., the geometry of the laminating nip, in combination with a measurement means, e.g., a calibrated gauge pressure. Suitable means that may be used to apply pressure include platen presses; counterpoised, double roll, laminating devices; scanning, single roll, laminating devices; vacuum laminating devices; and the like. When the receptor substrate (32) has an air impervious surface, roll laminating devices are preferred since they readily minimize air entrapment between the toned image layer (18), the combined dielectric and adhesive layer (16), and the receptor substrate (32) during the pressure laminating process step. Vacuum may be applied with such devices to further eliminate air entrapment. When the receptor substrate (32) is rigid and roll laminating devices are used, the flexible imaged electrographic element (10) typically is pressure laminated to the receptor substrate (32).

Heat may be used in the pressure laminating step ( step (B)) of this invention to raise the temperature of the combined dielectric and adhesive layer (16) from its normal ambient temperature (e.g., room temperature) where it is substantially tack-free, to a temperature at which the adhesive properties are activated. Heat may be applied to the combined dielectric and adhesive layer (16) prior to and/or concurrently with the application of the applied pressure (31). Thus, the receptor substrate (32) and/or the imaged electrographic element (10) may be heated prior to pressure lamination by radiant or contact heaters and then laminated while hot. Alternatively the pressure means itself may also function as a heater, e.g., such as a hot roll laminator, or both prior and concurrent heating may be used in combination. Preferably, a laminating temperature of about 100° C. or greater is employed. Typically, temperature is measured on the surface of the heated roll or platen by means of temperature sensitive tape.

Using the process of this invention, surprisingly strong adhesion of the toned electrographic element (10) to the receptor substrate (32) is achieved with substantially no image distortion, even though the toned image layer (18) is interposed between the dielectric/adhesive layer (16) and the receptor substrate (32).

Figure 6:
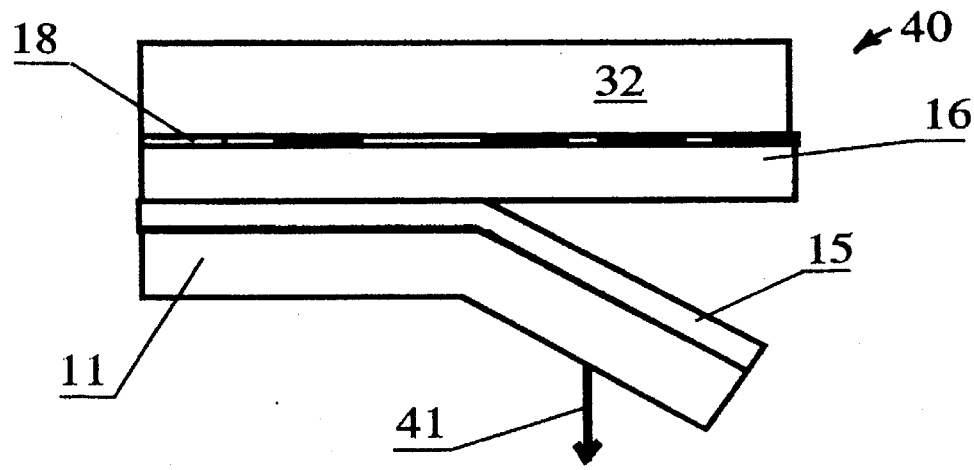
FIG. 6, schematically illustrates the step of peeling of the base and release layer from the laminated composite created in the step illustrated in FIG. 5.

In a preferred embodiment of this invention, a third process step comprises removing the base layer (11) together with the release layer (15) from the surface of the combined dielectric and adhesive (16) of the imaged electrographic element (30). Referring to FIG. 6, the base layer (11) is peeled, using a peel force (41), from the surface of the dielectric/adhesive layer (16) to form an imaged electrographic element (40). Typically, the base layer (11) is peeled with a peel force (41) directed at an angle of 90° or more from the surface of the dielectric/adhesive layer (16). The peel rate and the peel force (41) are not critical and preferred values will depend on the nature of the conductive and carrier materials. The temperature at which the base layer (11) is peeled from the dielectric/adhesive layer (16) will depend on the properties of the release layer. Surprisingly it has been found that the base layer (11) can be removed immediately after formation of the imaged electrographic element (30) (i.e., while still in a heated state from the lamination in the second process step) without delamination of the activated dielectric and combined layer (16) or any of the other component layers. In this context, the term "immediately" is intended to mean a time span of about 1 minute or less and preferably between about 1 second and about 20 seconds. Still more preferably the base is removed after about 5 to 10 seconds.

In the practice of the process of this invention where the base layer is to be removed, it is preferred to keep the base layer in place on the imaged electrographic element throughout storage and processing in order to prevent any damage or marring to the underlying layers. In this instance, removal of the base layer is the very last step in preparing and mounting the protected electrographic image.

As has also been surprisingly found, the base need not be removed immediately. The formed laminated imaged electrographic element (30) may be cooled and stored before removal of the base. In this instance, the base layer (11) and release layer (15) can be removed at room temperature from the imaged electrographic element (30) without delamination of the combined dielectric and adhesive layer (16).

Alternatively, the imaged electrographic element (30) may be reheated prior to removal of the base layer (11). If reheated such temperature may be within + or −5° C. of the laminating temperature, but such selection is not essential.

The electrographic process of this invention will now be illustrated by the following examples but is not intended to be limited thereby.

EXAMPLE 1

An electrographic element having the structure shown in FIG. 2, was prepared as follows: A 70 g/m² opaque conductive paper identified as Product OCB-12 available from Chartham Paper Mills, Canterbury, Kent, U.K. was coated by the reverse gravure method with a silicone release layer (SWM 96"C" available from Release International, West Chicago, Ill. at a coated weight of 0.3 lbs/tsf (1.5 g/m²) and cured by electron beam radiation. This formed a conductive carrier sheet having a release layer thereon. The surface electrical resistivity of the release layer measured at 50% Relative Humidity, (RH) was 9 Mohm/square, the surface energy was between 25 and 30 dynes/cm, and the Sheffield Smoothness was 25 ml/min.

A conductive coating was prepared from the following ingredients:

| Ingredient | Parts by Weight |
| --- | --- |
| Ethanol | 57 |
| Water | 19 |
| Chemistat ® 6300H[1] | 24 |

[1]Chemistat ® 6300H electroconductive polymer is a product of Sanyo Chemical Industries and is a cation type styrene-methacrylate copolymer in aqueous solution.

The three ingredients were mixed together with a Lightnin Mixer for 10 minutes.

This coating was applied to the side opposite the release coating on the conductive paper by the rod coating method at a wet coat weight of 3.2 lb/tsf(15.6 g/m²) and dried. The resulting coated conductive paper formed the conductive base for this element.

A combined transparent dielectric and adhesive coating mixture which also has protective properties, and wherein the adhesive properties are heat activated, was prepared from the following ingredients:

| Ingredient | Parts by Weight |
| --- | --- |
| Ethanol | 120 |
| Acetone | 440 |
| Toluene | 720 |
| Butvar B-76 polyvinyl butyral[1] | 130 |
| Acrylic Resin E-342[2] | 440 |
| Syloid 74[3] Amorphous silica slurry 9 μm | 20 |
| Hydrocarb PG3[4] | 175 |
| Piccolastic A-5[5] | 52 |

[1]Butvar ® B-76 polyvinyl butyral (weight ave. molecular weight: 90,000–120,000) is a product of Monsanto Company, St. Louis, Missouri.
[2]Acrylic resin E-342 is a product of Rohm and Haas a solvent based modified acrylic copolymer.
[3]Syloid ® amorphous silica slurry has average particle size 9 μm and is produced by Davison Chemical Division, W.R. Grace & Co., Baltimore Md.
[4]Hydrocarb ® PG3 wet ground calcium carbonate with average particle size of 3 μm is a product of OMYA, Proctor, Vermont.
[5]Piccolastic ® A-5 low molecular weight polystyrene is a product of Hercules Co., Wilmington, Delaware.

The first three of the above ingredients were added to a Kady mill and the Butvar was stirred in. After 15 minutes of mixing the acrylic resin and the polystyrene were added. After a further 5 minutes of mixing the calcium carbonate and the amorphous silica were added and the mixing continued for 10 minutes.

The above dielectric mixture was applied to the release coated surface of the conductive base paper by reverse roll coating and dried to give a dry coat weight of 1.5 lbs/tsf (7.3 g/m²), to form the electrographic element.

Rolls of the electrographic element were moisturized to a level of from 6 to 7% by weight and a four color toned image layer was deposited on the adhesive protective dielectric layer using a Versatec® 8944 Color Electrostatic Printer (a product of Xerox Engineering Systems, San Jose, Calif.) using standard toners and plotting conditions. Observed image quality was rated high.

The element was next laminated onto a receptor surface by first laying the imaged electrographic element on a receptor sheet of ScotchCal™ 220 pressure sensitive vinyl (a product of 3M Co., St. Paul, Minn.) with the toned image in contact with the receptor sheet. This composite was then passed through the hot nip of an IT 6000 hot roll laminator (obtained from Image Technologies Corp., Cottage Grove, Wis.) at a speed of 2 fpm (0.61 m/min), 250° F. (121° C.) and a pressure of 100 psi (7.03 Kg/cm$^2$). The base sheet was removed approximately 10 s after the laminated composite was removed from the hot nip. The toned image and the dielectric coating remained adhered to the vinyl and the release coating remained on the paper.

The image surface had a low glare surface with a 75° gloss of between 30 and 35%. The image was not removed by 810 Scotch™ Brand Tape when tested with the tape pull procedure. The image withstood cleansing with common non-abrasive household cleaners and scrubbing with a nylon bristle brush.

EXAMPLE 2

An imaged electrographic element prepared as disclosed in example 1 above was laminated onto a Hi-Stat® Static Cling Vinyl receptor substrate using the laminator and laminating conditions also disclosed in example 1. Hi-Stat® Static Cling Vinyl is a product of Catalina, of Calabassas, Calif. Results were similar to the results of example 1.

EXAMPLE 3

An imaged electrographic element prepared as disclosed in example 1 above was laminated onto a Saturn Opaque Banner® Vinyl receptor substrate using the laminator and laminating conditions also disclosed in example 1. Saturn Opaque Banner Vinyl® is a product of ICG Co., Kingsport, Tenn. Results were similar to the results of example 1.

EXAMPLE 4

An imaged electrographic element prepared as disclosed in example 1 above was laminated onto an Ultramag® Vinyl Coated Magnetic Material receptor substrate using the laminator and laminating conditions also disclosed in example 1. Ultramag® Vinyl Coated Magnetic Material is a product of Flexmag Industries, Cincinnati, Ohio. Results were similar to the results of example 1.

EXAMPLE 5

An imaged electrographic element prepared as disclosed in example 1 above was laminated onto a Komatex® Rigid PVC Board used as the receptor substrate, using the laminator and laminating conditions also disclosed in example 1. Komatex® Rigid PVC Board is a product of Kommerling of Germany, distributed in this country through Kommerling, Montvale, N.J. Results were similar to the results of example 1.

EXAMPLE 6

A roll of a toned, imaged electrographic element prepared as disclosed in Example 1 was mounted on the top feed spool of an IT 6000 hot roll laminator and threaded through the nip so that the base side of the element contacted the top hot roll for several inches before the nip. A roll of Scotch-Cal® 7725 pressure sensitive vinyl (a product of 3M Co., St. Paul, Minn.) was mounted on the bottom feed spool and threaded through the nip so that vinyl side was in contact with the image side of the electrographic element. The composite was laminated in the hot nip at a speed of approximately 2 fpm (0.61 m/min), a temperature of 250° F. (121° C.) and a pressure of 100 psi (7.03 Kg/m$^2$). The laminated composite was collected on the take-up spool of the laminator. The base was removed approximately 5 minutes later. The image and the dielectric coating remained adhered to the vinyl and the release coating remained on the base.

EXAMPLE 7

An electrographic element was prepared as follows: To produce a base for use in an element of the type disclosed in FIG. 1, a 63 gsm opaque conductive paper available as Product DR Base from Otis Specialty Papers, Livermore Falls, Me., was coated by the offset gravure method with a silicone release layer identified as SWM 96"C" available from Release International, West Chicago, Ill. at a coated weight of 0.4 lbs/tsf(1.95 Kg/m$^2$). The release layer was cured after coating, by electron beam radiation. The surface electrical resistivity of the release coated surface measured at 50% RH was 3 Mohm/square, the surface energy was between 25 and 30 dynes/cm, and the Sheffield Smoothness was 20 ml/min.

A dielectric/adhesive coating mixture having protective and heat activated adhesive properties prepared as described in Example 1 was applied to the release coated surface of the conductive base paper by the reverse roll coating method and dried to give a dry coat weight of 1.5 lb/tsf (7.3 g/m$^2$) to form the electrographic element.

Rolls of the electrographic element were moisturized to a level of about 6% by weight and a four color image layer was deposited on the adhesive protective dielectric layer using a Versatec™ 8944 Color Electrostatic Printer (a product of Xerox Engineering Systems, San Jose, Calif.) and standard toners and plotting conditions. Image quality was rated high.

The toned element was next laminated on a receptor sheet of ScotchCal™ 220 pressure sensitive vinyl by first laying the imaged electrographic element of Example 1 on the sheet of ScotchCal™ 220. ScotchCal™ 220 pressure sensitive vinyl is a product of 3M Co., St. Paul, Minn. This composite was then passed through the hot nip of an IT 6000 hot roll laminator at a speed of 2 fpm (0.61 m/min), a temperature of 50° F. (121° C.) and a pressure of 100 psi (7.03 g/m$^2$).

Following lamination, the base was removed approximately 10 s after the composite was removed from the hot nip. The image and the dielectric/adhesive coating remained adhered to the vinyl while the release coating remained on the conductive paper.

The image on the receptor sheet, had a low glare surface with a 75° gloss of between 40 and 45%. It withstood gentle scribing with 4H and 8H pencils. At high scribing pressure the vinyl layer was broken.

EXAMPLE 8

This example shows an alternate combined dielectric adhesive formulation for use in an electrographic element in accordance with the present invention.

A combined dielectric and adhesive coating was prepared from the following ingredients:

| Ingredient | Parts by Weight |
|---|---|
| Toluene | 42.50 |
| Kraton ® FG-1921X[6] | 7.50 |
| Dowanol ® PM[7] | 2.93 |
| Toluene | 24.59 |
| Methyl ethyl ketone | 9.55 |
| Calcined clay[8] (ave. particle size 1.4 µm) | 0.50 |
| Amorphous silica[9] (ave. particle size 9 µm) | 1.05 |
| Lustran ® 33-1000 SAN[10] resin | 11.38 |

[6]Kraton ® FG-1921X is a styrene ethylene butylene styrene block copolymer thermoplastic rubber and is a product of Shell Oil Company, Houston, Texas.
[7]Dowanol ® PM is propylene glycol monomethyl ether and is a product of Dow Chemical Corp.
[8]Calcined clay is Translink ® 37 calcined clay, a product of Englehard Corporation.
[9]Amorphous silica is Syloid ® 74 and is a product of Davison Chemical Division, W. R. Grace & Co.
[10]Lustran ® 33-1000 SAN resin is a styrene-acrylonitrile copolymer (CAS No.:9003-54-7) and is a product of Monsanto Company, St. Louis, Missouri.

The toluene was added to a vessel and stirred with a Lightnin mixer. The Kraton® was added slowly and mixed under slow agitation. The remaining ingredients were added in the sequence shown and mixed with a Dispermat® mixer under slow speed agitation and then allowed to mix for 10 minutes at high speed. The two mixtures were then blended in a vessel and stirred at slow speed with a Dispermat® mixer.

The mixture was coated onto a base comprising the same conductive carrier sheet having a release layer thereon as used in example 1 above. The coating was done with a No. 12 Meyer rod, and dried in an air oven at 240° F. (116° C.) for 30 seconds to form an electrographic element having a transparent combined dielectric and adhesive layer.

After conditioning a sample of the electrographic element at 50% relative humidity a toned image was produced on the sample by using a Versatec V-80 electrostatic plotter operated at conventional plotting conditions.

The laminating step was performed as described in Example 1 except that the receptor substrate was Rexcal 4000, a pressure sensitive vinyl polymer available from Rexham Branded Products, Lancaster, S.C.

Following lamination the base was striped from the combined transparent dielectric and adhesive layer, the break occuring between the release coating and the combined dielectric and adhesive layer.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. An imaged article comprising in the order given:
   1) a receptor substrate;
   2) a toned image;
   3) a single, continuous transparent layer comprising an adhered combined adhesive and dielectric layer which is substantially tack-free at ambient temperature and which has a dielectric constant of about 2 to 5, wherein the image and transparent layer have been placed on the substrate by a process comprising the steps of:

A) electrographically depositing an electrostatic charge in image-wise fashion onto an image receptive surface of an electrographic element comprising in the order given;
      i) a conductive base,
      ii) a release layer, and
      iii) the single, transparent, combined dielectric and adhesive layer, wherein said combined dielectric and adhesive layer is substantially tack-free at ambient temperature, and is activated at a temperature which is above ambient temperature of the electrographic element, and has a dielectric constant of about 2 to 5, the image receptive surface being an exposed surface of said single combined dielectric and adhesive layer, to form a latent image;
   B) applying a toner layer onto said electrostatic charge to produce a toned image;
   C) contacting said toned image and combined adhesive and dielectric layer with a surface of the receptor substrate at a temperature sufficient to activate the combined dielectric and adhesive layer to adhere the electrographic element to the substrate and
   D) removing the conductive base and the release layer from the combined dielectric and adhesive layer of the electrographic element adhered onto the receptor substrate following step (C), to form the imaged article.

2. The article of claim 1 wherein in the contacting step (C), the receptor substrate is pressure laminated to the toned image receptive surface by passing the electrographic element and the receptor substrate in surface-to-surface contact through a nip of pressure rollers to form a laminate.

3. The article of claim 1 wherein in the contacting step (C), the receptor substrate is pressure laminated to the toned image receptive surface at a temperature of about 100° C. or greater.

4. The article of claim 1 wherein the combined dielectric and adhesive layer is a film forming material, and comprises one or more of the following:

polyurethanes; polyamides; polyolefins; polycarbonates; polystyrenes; and/or polymers or copolymers of acrylic or methacrylic acids, esters, amides, or the like (such as polymethylmethacrylate), styrenes, acrylonitriles, vinyl esters, alkyd substituted vinyl esters, vinyl alcohol, vinyl acetals (e.g., polyvinyl butyral), vinyl chloride, vinyl fluoride, vinylidene chloride, 1,4-dienes (e.g., butadiene, isoprene and the like); ethylene/vinyl alcohol copolymers; copolymers of styrene with acrylic and methacrylic monomers; modified cellulosic resins such as cellulose acetate and cellulose acetate butyrate; block copolymer thermoplastic rubbers (e.g., styrene/ethylene/butylene/styrene block copolymer); and blends of the above.

5. The article of claim 1 wherein the transparent combined dielectric and adhesive layer has a thickness in the range of about 1 µm to about 20 µm.

6. The article of claim 1 wherein the image on the substrate comprises a plurality of different color toners.

7. The article of claim 1 wherein the combined dielectric and adhesive layer also comprises components which strongly absorb ultraviolet light.

8. The article of claim 1 wherein the single, continuous transparent layer over said toned image comprising a combined adhesive and dielectric layer has an outer surface which replicates a pattern on the release layer.

9. The article of claim 1 wherein the single, continuous transparent layer over said toned image comprising a combined adhesive and dielectric layer has an outer surface which is smooth thereby having a glossy appearance.

10. The article of claim 1 wherein the combined dielectric and adhesive layer also comprises particles sufficiently large to result in a layer with surface irregularities whereby the outer surface has a matte appearance.

11. The article of claim 29 wherein said article is a billboard.

12. The article of claim 1 wherein said article is a large format poster.

* * * * *